United States Patent [19]

Miller

[11] Patent Number: 5,149,421

[45] Date of Patent: Sep. 22, 1992

[54] CATALYTIC DEWAXING PROCESS FOR LUBE OILS USING A COMBINATION OF A SILICOALUMINOPHOSPHATE MOLECULAR SIEVE CATALYST AND AN ALUMINOSILICATE ZEOLITE CATALYST

[75] Inventor: Stephen J. Miller, San Francisco, Calif.

[73] Assignee: Chevron Research Company, San Francisco, Calif.

[21] Appl. No.: 401,170

[22] Filed: Aug. 31, 1989

[51] Int. Cl.⁵ .............................................. C10G 11/02
[52] U.S. Cl. .................................. 208/114; 208/113; 208/111; 208/27; 208/46
[58] Field of Search ........ 208/114, 120 MC, 111 MC, 208/14, 18, 97; 585/739

[56] References Cited

U.S. PATENT DOCUMENTS

| | | | |
|---|---|---|---|
| 4,512,875 | 4/1985 | Long et al. | 208/120 MC |
| 4,584,091 | 4/1986 | Pine | 208/120 MC |
| 4,764,269 | 8/1988 | Edwards et al. | 208/114 |
| 4,803,184 | 2/1989 | Long et al. | 208/114 |
| 4,818,734 | 4/1989 | Gortsema | 502/208 |
| 4,867,862 | 9/1989 | Ziemer | 208/59 |
| 4,880,760 | 4/1989 | Pellet et al. | 502/67 |
| 4,886,934 | 12/1989 | Maxwell | 208/59 |
| 4,960,504 | 10/1990 | Pellet | 208/18 |

*Primary Examiner*—Helane E. Myers
*Attorney, Agent, or Firm*—V. J. Cavalieri

[57] ABSTRACT

The present invention relates to a process for catalytically dewaxing a hydrocarbon oil feedstock by contacting the feedstock with a combination of a catalyst comprising an intermediate pore size silicoaluminophosphate molecular sieve and a hydrogenation component and an intermediate pore size aluminosilicate zeolite catalyst.

21 Claims, 1 Drawing Sheet

CATALYTIC DEWAXING PROCESS FOR LUBE OILS USING A COMBINATION OF A SILICOALUMINOPHOSPHATE MOLECULAR SIEVE CATALYST AND AN ALUMINOSILICATE ZEOLITE CATALYST

BACKGROUND OF THE INVENTION

The present invention relates to a process for catalytically dewaxing lube oils. More specifically, the invention relates to a process for dewaxing a hydrocarbon oil feedstock wherein the feedstock is contacted with a combination of an aluminosilicate zeolite catalyst and an intermediate pore size silicoaluminophosphate molecular sieve catalyst.

DESCRIPTION OF THE RELATED ART

Processes for dewaxing petroleum distillates are well known. Dewaxing is required when highly paraffinic oils are to be used in products which must be mobile at low temperatures, e.g., lubricating oils, heating oils, and jet fuels. The higher molecular weight straight chain normal and slightly branched paraffins present in such oils are waxes which cause high pour points and high cloud points in the oils. If adequately low pour points are to be obtained, the waxes must be wholly or partially removed. In the past, various solvent removal techniques were employed to remove such waxes, such as propane dewaxing and MEK dewaxing, however, these techniques are both costly and time consuming. Catalytic dewaxing processes are more economical and remove the waxes by selectively cracking the longer chain n-paraffins to produce lower molecular weight products, some of which may be removed by distillation.

Because of their selectivity, prior art dewaxing catalysts generally comprise an aluminosilicate zeolite having a pore size which admits the straight chain n-paraffins either alone or with only slightly branched chain paraffins, but which excludes more highly branched materials, cycloaliphatics and aromatics. Zeolites such as ZSM-5, ZSM-11, ZSM-12, ZSM-23, ZSM-35 and ZSM-38 have been proposed for this purpose in dewaxing processes. Their use is described in U.S. Pat. Nos. 3,700,585; 3,894,938; 4,176,050; 4,181,598; 4,222,855; 4,229,282 and 4,247,388.

Since dewaxing processes of this kind function by means of cracking reactions, a number of useful products become degraded to lower molecular weight materials. For example, waxy paraffins may be cracked down to butane, propane, ethane and methane and so may the lighter n-paraffins which do not contribute to the waxy nature of the oil. Because these lighter products are generally of lower value than the higher molecular weight materials, it is desirable to limit the degree of cracking which takes place during a catalytic dewaxing process.

European Patent Application No. 225,053 discloses a process for producing lubricant oils by partially dewaxing a lubricant base stock by isomerization dewaxing followed by a selective dewaxing step. The isomerization dewaxing step is carried out using a large pore, high silica zeolite dewaxing catalyst such as high silica Y or zeolite beta which isomerizes the waxy components of the base stock to less waxy branched chain isoparaffins. The selective dewaxing step may be either a solvent, e.g., MEK dewaxing operation or a catalytic dewaxing, preferably using a highly shape zeolite such as ZSM-22 or ZSM-23.

U.S. Pat. No. 4,437,976 discloses a two-stage hydrocarbon dewaxing hydrotreating process wherein the pour point of a hydrocarbon charge stock boiling from 400° F. to 1050° F. is reduced by catalytically dewaxing the charge stock in the presence of a zeolite catalyst and subsequently subjecting at least the liquid portion thereof to hydrogenation in the presence of a hydrotreating catalyst comprising a hydrogenating component and a siliceous porous crystalline material from the class of ZSM-5, ZSM-11, ZSM-23 and ZSM-35 zeolites.

U.S. Pat. No. 4,575,416 to Chester et al. discloses a hydrodewaxing process with a first zeolitic catalyst having a Constraint Index not less than 1, a second catalytic component of specified characteristics and a hydrogenation component.

As set forth in co-pending application Ser. No. 07/351,532, applicant previously discovered a dewaxing catalyst which provides superior selectivity with respect to the nature of the products obtained in a dewaxing process. Applicant discovered that by using an intermediate pore size silicoaluminophosphate molecular sieve catalyst in the dewaxing process, hydrocarbon oil feedstocks can be effectively dewaxed and the products obtained thereby are of higher molecular weight than those obtained using the prior art aluminosilicate zeolites. The products obtained from the dewaxing process have better viscosities and viscosity indexes at a given pour point as compared to the above-described prior art process using aluminosilicate zeolites.

SUMMARY OF THE INVENTION

The present invention overcomes the problems and disadvantages of the prior art by providing a process for catalytically dewaxing a hydrocarbon oil feedstock which produces a lube oil having an improved viscosity index and superior yield.

It is an object of the invention to provide a process for dewaxing a lube oil which produces a yield and viscosity index improvement which in combination is greater than the viscosity index or yield achievable with either an intermediate pore size silicoaluminophosphate molecular sieve catalyst or a shape selective catalyst such as an intermediate pore size aluminosilicate zeolite catalyst.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a process for catalytically dewaxing a hydrocarbon oil feedstock boiling above 350° F. and containing straight chain and slightly branched chain hydrocarbons comprising contacting the hydrocarbon oil feedstock with an intermediate pore size aluminosilicate zeolite catalyst and a catalyst comprising an intermediate pore size silicoaluminophosphate molecular sieve and a hydrogenation component.

The combination of the catalysts produces a greater yield of lube oil than achieved when dewaxing is carried out with either catalyst alone. Since lube oil is valuable, maximization of the yield is commercially important.

The catalyst comprising an intermediate pore size silicoaluminophosphate molecular sieve and a hydrogenation component is employed in the process of the invention to reduce the pour point of the hydrocarbon oil feedstock to an intermediate value, i.e., of from about 30° F. to about 60° F. Selective conversion of waxy n-paraffins to non-waxy paraffins occurs during processing. The waxy paraffins undergo mild cracking reactions to yield non-waxy products of higher molecular weight than compared to products obtained using the prior art zeolitic catalysts. At the same time, a measure of isomerization takes place, so that not only is the pour point reduced by reason of the cracking reactions described above, but in addition, the n-paraffins become isomerized to iso-paraffins to form liquid range materials which contribute to a low viscosity, low pour point product. Due to the selectivity of the catalyst employed in the process of this invention, the gas yield is reduced, thereby preserving the economic value of the feedstock. Further, hydrogen consumption is less compared to prior art processes using conventional dewaxing catalysts because isomerization does not consume hydrogen and cracking to liquid range products consumes less hydrogen than cracking to gas.

The intermediate pore size aluminosilicate zeolite catalyst is employed in the process of the invention to further reduce the pour point to a desired level. Suitable aluminosilicate zeolite catalysts for use in the process of the invention are those catalysts that are very selective for cracking out the remaining amount of waxy paraffins left in the hydrocarbon oil feedstock following the isomerization step of the process. Zeolites that are very selective for cracking out the remaining amount of waxy paraffins are those aluminosilicate zeolite catalysts having a Constraint Index measured at from 400° C. to about 454° C. of from about 4 to about 12. Such catalysts are described in U.S. Pat. No 4,658,079, the pertinent disclosure of which is incorporated herein by reference.

The accompanying drawings, which are incorporated in and constitute a part of this specification, illustrate several exemplary embodiments of this invention and together with the description, serve to explain the principles of the invention.

DESCRIPTION OF THE PREFERRED EMBODIMENTS

Reference will now be made in detail to the preferred embodiments of applicant's invention.

Feedstock

The process of the invention may be used to dewax a variety of feedstocks ranging from relatively light distillate fractions up to high boiling stocks such as whole crude petroleum, reduced crudes, vacuum tower residua, cycle oils, synthetic crudes (e.g., shale oils, tar sand oil, etc.), gas oils, vacuum gas oils, foots oils, and other heavy oils. The feedstock will normally be a $C_{10}+$ feedstock generally boiling above about 350° F. since lighter oils will usually be free of significant quantities of waxy components. However, the process is particularly useful with waxy distillate stocks such as middle distillate stocks including gas oils, kerosenes, and jet fuels, lubricating oil stocks, heating oils and other distillate fractions whose pour point and viscosity need to be maintained within certain specification limits. Lubricating oil stocks will generally boil above 230° C. (450° F.), more usually above 315° C. (600° F.). Hydroprocessed stocks are a convenient source of stocks of this kind and also of other distillate fractions since they normally contain significant amounts of waxy n-paraffins. The feedstock of the present process will normally be a $C_{10}+$ feedstock containing paraffins, olefins, naphthenes, aromatics and heterocyclic compounds and a substantial proportion of higher molecular weight n-paraffins and slightly branched paraffins which contribute to the waxy nature of the feedstock. During processing, the n-paraffins and slightly branched paraffins undergo some cracking or hydrocracking to form liquid range materials which contribute to a low viscosity product. The degree of cracking which occurs is, however, limited so that the gas yield is reduced, thereby preserving the economic value of the feedstock. Typical feedstocks include light gas oils, heavy gas oils and reduced crudes boiling above 350° F.

While the process of the invention can be practiced with utility when the feed contains organic nitrogen (nitrogen-containing impurities), it is preferred that the organic nitrogen content of the feed be less than 50 ppmw, more preferably less than 10 ppmw. Particularly good results, in terms of activity and length of catalyst cycle (period between successive regenerations or start-up and first regeneration), are experienced when the feed contains less than 10 ppmw of organic nitrogen.

Silicoaluminophosphate Molecular Sieve Catalyst Compositions (SAPOs)

The catalyst employed in the process of the invention has an acidic component and a hydrogenation component. The acidic component comprises an intermediate pore size silicoaluminophosphate molecular sieve which is described in U.S. Pat. No. 4,440,871, the pertinent disclosure of which is incorporated herein by reference.

Figure 1:
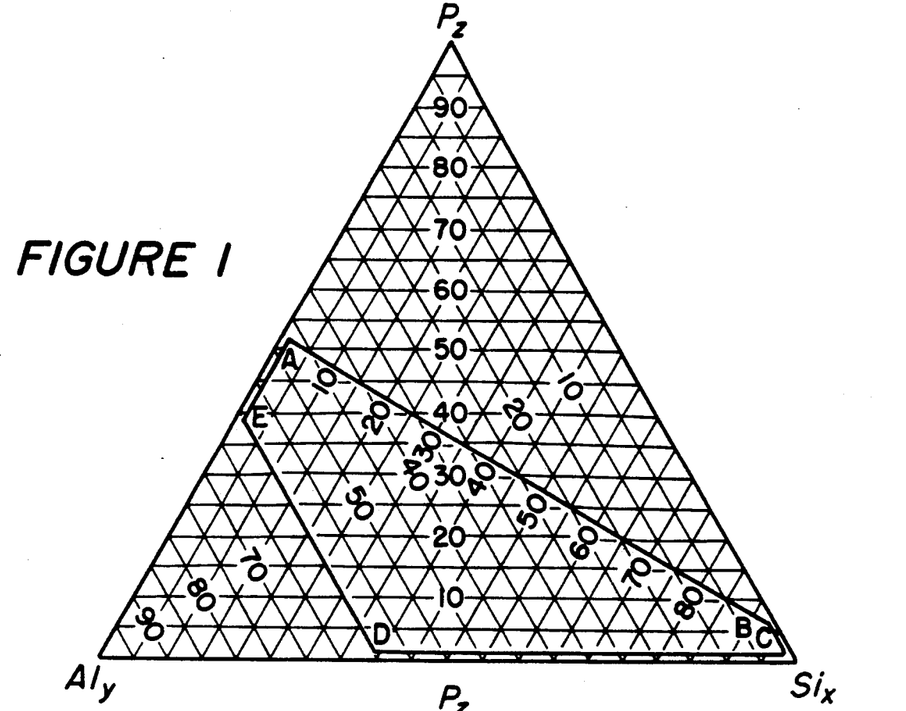
FIG. 1 is a ternary diagram showing the compositional parameters of the silicoaluminophosphates of U.S. Pat. No. 4,440,871 in terms of mole fractions of silicon, aluminum and phosphorus.

The preferred intermediate pore size silicoaluminophosphate molecular sieves (SAPOs) are characterized as comprising a three-dimensional micro-porous crystal framework structure of $[SiO_2]$, $[AlO_2]$ and $[PO_2]$ tetrahedral units which have a unit empirical formula on an anhydrous basis of:

$$mR:(Si_xAl_yP_z)O_2 \qquad (I)$$

wherein "R" represents at least one organic templating agent (hereinafter also referred to as "template") present in the intracrystalline pore system; "m" represents the moles of "R" present per mole of $(Si_xAl_yP_z)O_2$ and has a value of from zero to about 0.3, with the maximum value of "m" being related at least in part to the molecular dimensions of the template and the void volume of the intracrystalline pore system of the particular SAPO; "x", "y" and "z" represent the mole fractions of silicon, aluminum and phosphorus, respectively, present as tetrahedral oxide units, said mole fractions being within the pentagonal compositional area defined by points A, B, C, D and E of the ternary compositional diagram depicted by FIG. 1 wherein points A, B, C, D and E are represented by the following values for "x", "y" and "z":

| Point | Mole Fraction | | |
|---|---|---|---|
| | x | y | z |
| A | 0.01 | 0.47 | 0.52 |
| B | 0.94 | 0.01 | 0.05 |
| C | 0.98 | 0.01 | 0.01 |
| D | 0.39 | 0.60 | 0.01 |
| E | 0.01 | 0.60 | 0.39 |

Figure 2:
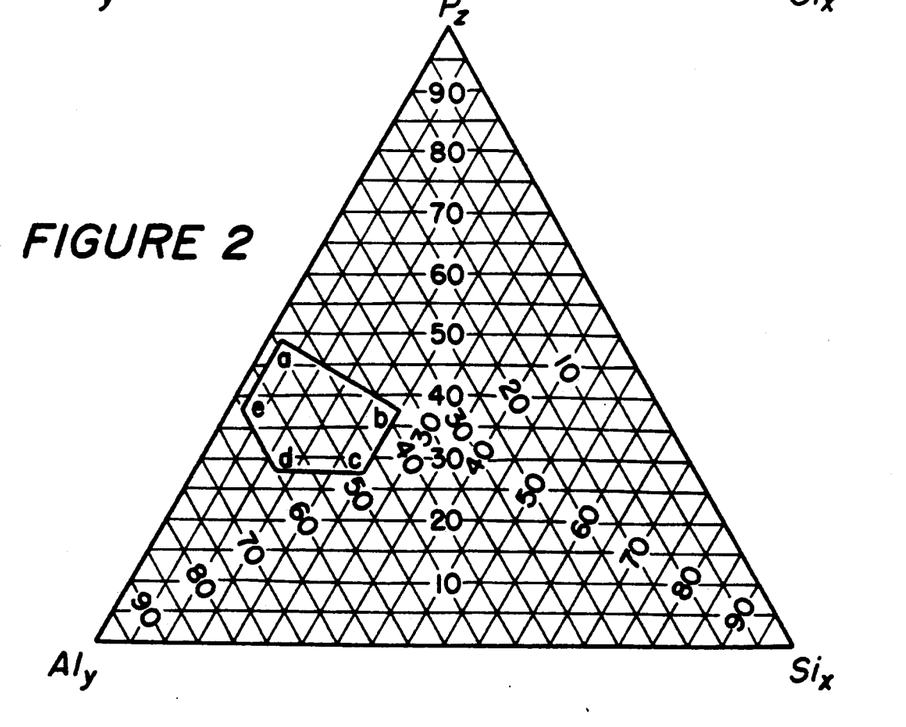
FIG. 2 is a ternary diagram showing the preferred compositional parameters of the silicoaluminophosphates of mole fractions in terms of silicon, aluminum and phosphorus.

A preferred sub-class of the SAPOs of formula (I), have a minimum value of "m" of 0.02 in the as-synthesized form and have values of "x", "y", and "z" within the pentagonal compositional area defined by points a, b, c, d, and e of the ternary diagram of FIG. 2 wherein points a, b, c, d, and e are represented by the following values of "x", "y" and "z":

| Point | Mole Fraction | | |
|---|---|---|---|
| | x | y | z |
| a | 0.02 | 0.49 | 0.49 |
| b | 0.25 | 0.37 | 0.38 |
| c | 0.25 | 0.48 | 0.27 |
| d | 0.13 | 0.60 | 0.27 |
| e | 0.02 | 0.60 | 0.28 |

The term "unit empirioal formula" as used herein means the simplest formula which gives the relative number of atoms of silicon, aluminum and phosphorus which form a [PO$_2$], [AlO$_2$] and [SiO$_2$] tetrahedral unit within a silicoaluminophosphate molecular sieve and which form the molecular framework of the SAPO composition(s). The unit empirical formula is given in terms of silicon, aluminum and phosphorus as set forth in formula (I) and does not include other compounds, cations or anions which may be present as a result of the SAPO's preparation or existence of other impurities or materials in the bulk composition not containing the aforementioned tetrahedral unit as the molecular framework. The amount of template R is reported as part of the composition when the as-synthesized unit empirical formula is given, and water may also be reported unless such is defined as the anhydrous form. For convenience, the coefficient "m" for the template "R" is reported as a value that is normalized by dividing the number of moles of "R" by the total number of moles of silicon, phosphorus and aluminum. When moles of water are reported, the moles of water relative to the mole fractions of silicon, aluminum and phosphorus is reported as a value that is normalized by dividing the number of moles of water by the total moles of silicon, phosphorus and aluminum. The values of x, y and z are determined by dividing the number of moles of silicon, aluminum and phosphorus individually by the total number of moles of silicon, aluminum and phosphorus.

The unit empirical formula for a SAPO may be given on an "as-synthesized" basis or may be given after an "as-synthesized" SAPO composition has been subjected to some post treatment process, e.g., calcined. The term "as-synthesized" herein shall be used to refer to the SAPO composition(s) formed as a result of the hydrothermal crystallization but before the SAPO composition has been subjected to post treatment to remove any volatile components present therein. The actual value of "m" for a post-treated SAPO will depend on several factors (including the particular SAPO, and template, severity of the post-treatment in terms of its ability to remove the template from the SAPO, and the proposed application of the SAPO composition) and the value for "m" can be within the range of values as defined for the as-synthesized SAPO compositions although such is generally less than the as-synthesized SAPO unless such post-treatment process adds template to the SAPO so treated. A SAPO composition which is in the calcined or other post-treated form generally has an empirical formula represented by the formula (I), except that the value of "m" is generally less than about 0.02. Under sufficiently severe post-treatment conditions, e.g., roasting in air at high temperature for long periods (over 1 hr.), the value of "m" may be zero (0) or, in any event, the template, R, is undetectable by normal analytical procedures.

The above silicoaluminophosphates are generally synthesized by hydrothermal crystallization from a reaction mixture comprising reactive sources of silicon, aluminum and phosphorus, and one or more organic templating agents. Optionally, alkali metal(s) may be present in the reaction mixture. The reaction mixture is placed in a sealed pressure vessel, preferably lined with an inert plastic material, such as polytetrafluoroethylene, and heated, preferably under autogenous pressure at a temperature of at least about 100° C., preferably between 100° C. and 250° C., until crystals of the silicoaluminophosphate product are obtained, usually for a period of from about 2 hours to about 2 weeks. While not essential to the synthesis of SAPO compositions, it has been found that in general, stirring or other moderate agitation of the reaction mixture with seed crystals of either the SAPO to be produced, or a topologically similar composition, facilitates the crystallization procedure. The product is recovered by any convenient method such as centrifugation or filtration.

After crystallization the SAPO may be isolated and washed with water and dried in air. As a result of the hydrothermal crystallization, the as-synthesized SAPO contains within its intracrystalline pore system at least one form of the template employed in its formation. Generally, the template is a molecular species, but it is possible, steric considerations permitting, that at least some of the template is present as a charge-balancing cation. Generally, the template is too large to move freely through the intracrystalline pore system of the formed SAPO and may be removed by a post-treatment process, such as by calcining the SAPO at temperatures of between about 200° C. and about 700° C. so as to thermally degrade the template, or by employing some other post-treatment process for removal of at least part of the template from the SAPO. In some instances, the pores of the SAPO are sufficiently large to permit transport of the template, and, accordingly, complete or partial removal thereof can be accomplished by conventional desorption procedures such as are carried out in the case of zeolites.

The SAPOs are preferably formed from a reaction mixture having a mole fraction of alkali metal cation that is sufficiently low to not interfere with the formation of the SAPO composition. Although the SAPO compositions will form if alkali metal cations are present, reaction mixtures having the following bulk composition are preferred:

$$aR_2O:(Si_xAl_yP_z)O_2:bH_2O$$

wherein "R" is a template; "a" has a value great enough to constitute an effective concentration of "R" and is within the range of from greater than zero (0) to about 3; "b" has a value of from zero to 500; "x", "y" and "z" represent the mole fractions, respectively, of silicon, aluminum and phosphorus wherein x, y and z each have a value of at least 0.01. The reaction mixture is preferably formed by combining at least a portion of the reactive aluminum and phosphorus sources in the substantial absence of the silicon source and thereafter combining the resulting reaction mixture comprising aluminum and phosphorus sources with the silicon source. When the SAPOs are synthesized by this method, the value of "m" in Formula (1) is generally above about 0.02.

Although the presence of alkali metal cations is not preferred, when present in the reaction mixture, it is preferred to first admix at least a portion of each of the aluminum and phosphorus sources in the substantial absence of the silicon source. This procedure avoids adding the phosphorus source to a highly basic reaction mixture containing the silicon and aluminum source.

The reaction mixture from which these SAPOs are formed contain one or more organic templating agents (templates) which can be most any of those heretofore proposed for use in the synthesis of aluminosilicates. The template preferably contains at least one element of Group VA of the Periodic Table, preferably nitrogen, phosphorus, arsenic and/or antimony, more preferably nitrogen or phosphorus, most preferably nitrogen. The template contains at least one alkyl, aryl, araalkyl, or alkylaryl group. The template preferably contains from 1 to 8 carbon atoms, although more than eight carbon atoms may be present in the template. Nitrogen-containing templates are preferred, including amines and quaternary ammonium compounds, the latter being represented generally by the formula $R'_4N+$ wherein each $R'$ is an alkyl, aryl, alkylaryl, or araalkyl group; wherein $R'$ preferably contains from 1 to 8 carbon atoms or higher when $R'$ is alkyl and greater than 6 carbon atoms when $R'$ is otherwise. Polymeric quaternary ammonium salts such as $[(C_{14}H_{32}N_2)(OH)_2]_x$ wherein "x" has a value of at least 2 may also be employed. The mono-, di- and triamines, including mixed amines, may also be employed as templates either alone or in combination with a quaternary ammonium compound or another template.

Representative templates, phosphorus, aluminum and silicon sources as well as detailed process conditions are more fully described in U.S. Pat. No. 4,440,871, which is incorporated herein by reference.

By "intermediate pore size", as used herein, is meant an effective pore aperture in the range of about 5.3 to 6.5 Angstroms when the molecular sieve is in the calcined form. Molecular sieves having pore apertures in this range tend to have unique molecular sieving characteristics. Unlike small pore zeolites such as erionite and chabazite, they will allow hydrocarbons having some branching into the molecular sieve void spaces. Unlike larger pore zeolites such as the faujasites and mordenites, they can differentiate between n-alkanes and slightly branched alkanes on the one hand and larger branched alkanes having, for example, quaternary carbon atoms.

The effective pore size of the molecular sieves can be measured using standard adsorption techniques and hydrocarbonaceous compounds of known minimum kinetic diameters. See Breck, Zeolite Molecular Sieves, 1974 (especially Chapter 8); Anderson et al., J. Catalysis 58, 114 (1979); and U.S. Pat. No. 4,440,871, all of which are incorporated herein by reference.

Intermediate pore size molecular sieves will typically admit molecules having kinetic diameters of 5.3 to 6. Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular sieve, but do not penetrate as quickly and in some cases are effectively excluded. Compounds having kinetic diameters in the range of 6 to 6.5 Angstroms include: cyclohexane (6.0), 2,3-dimethylbutane (6.1), and m-xylene (6.1). Generally, compounds having kinetic diameters of greater than about 6.5 Angstroms do not penetrate the pore apertures and thus are not absorbed into the interior of the molecular sieve lattice. Examples of such larger compounds include: o-xylene (6.8), 1,3,5-trimethylbenzene (7.5), and tributylamine (8.1). The preferred effective pore size range is from about 5.5 to about 6.2 Angstroms.

In performing adsorption measurements to determine pore size, standard techniques are used. It is convenient to consider a particular molecule as excluded if it does not reach at least 95% of its equilibrium adsorption value on the molecular sieve in less than about 10 minutes (p/po=0.5; 25° C.).

The intermediate pore size molecular sieve is used in admixture with at least one Group VIII metal. Preferably, the Group VIII metal is selected from the group consisting of at least one of platinum and palladium, and optionally, other catalytically active metals such as molybdenum, nickel, vanadium, cobalt, tungsten, zinc, and mixtures thereof. More preferably, the Group VIII metal is selected from the group consisting of at least one of platinum and palladium. The amount of metal ranges from about 0.01% to about 10% by weight of the molecular sieve, preferably from about 0.2% to about 5% by weight of the molecular sieve. The techniques of introducing catalytically active metals into a molecular sieve are disclosed in the literature, and pre-existing metal incorporation techniques and treatment of the molecular sieve to form an active catalyst such as ion exchange, impregnation or occlusion during sieve preparation are suitable for use in the present process. Such techniques are disclosed in U.S. Pat. Nos. 3,236,761; 3,226,339; 3,236,762; 3,620,960; 3,373,109; 4,202,996; 4,440,781 and 4,710,485 which are incorporated herein by reference.

The term "metal" or "active metal" as used herein means one or more metals in the elemental state or in some form such as sulfide, oxide and mixtures thereof. Regardless of the state in which the metallic component actually exists, the concentrations are computed as if they existed in the elemental state.

The physical form of the silicoaluminophosphate molecular sieve and the aluminosilicate zeolite catalysts depend on the type of catalytic reactor being employed and may be in the form of a granule or powder, and is desirably compacted into a more readily usable form (e.g., larger agglomerates), usually with a silica or alumina binder for fluidized bed reaction, or pills, prills, spheres, extrudates, or other shapes of controlled size to accord adequate catalyst-reactant contact. The catalyst may be employed either as a fluidized catalyst, or in a fixed or moving bed, and in one or more reaction stages.

The intermediate pore size molecular sieve can be manufactured into a wide variety of physical forms. The molecular sieve can be in the form of a powder, a granule, or a molded product, such as an extrudate having a particle size sufficient to pass through a 2-mesh (Tyler) screen and be retained on a 40-mesh (Tyler) screen. In cases wherein the catalyst is molded, such as by extrusion with a binder, the silicoaluminophosphate can be extruded before drying, or dried or partially dried and then extruded.

In a preferred embodiment, the final catalyst will be a composite and includes an intermediate pore size silicoaluminophosphate molecular sieve, a platinum or palladium hydrogenation metal component and an inorganic oxide matrix. The most preferred silicoaluminophosphate is SAPO-11, the most preferred metal component is platinum, and the most preferred support is alumina.

The preferred intermediate pore size silicoaluminophosphate molecular sieves suitable for use in the process of this invention include SAPO-11, SAPO-31 and SAPO-41.

SAPO-11 comprises a silicoaluminophosphate material having a three-dimensional microporous crystal framework structure of $[PO_2]$, $[AlO_2]$ and $[SiO_2]$ tetrahedral units whose unit empirical formula on an anhydrous basis is:

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from zero to about 0.3, "x", "y" and "z" represent respectively, the mole fractions of silicon, aluminum and phosphorus, said mole fractions being within the compositional area bounded by points A, B, C, D and E on the ternary diagram of FIG. 1 or preferably within the area bounded by points a, b, c, d and e on the ternary diagram of FIG. 2. The silicoaluminophosphate molecular sieve has a characteristic X-ray powder diffraction pattern which contains at least the d-spacings (as-synthesized and calcined) set forth below in Table I. When SAPO-11 is in the as-synthesized form, "m" preferably has a value of from 0.02 to 0.3.

TABLE I

| 2θ | d | Relative Intensity |
|---|---|---|
| 9.4–9.65 | 9.41–9.17 | m |
| 20.3–20.6 | 4.37–4.31 | m |
| 21.0–21.3 | 4.23–4.17 | vs |
| 22.1–22.35 | 4.02–3.99 | m |
| 22.5–22.9 (doublet) | 3.95–3.92 | m |
| 23.15–23.35 | 3.84–3.81 | m–s |

All of the as-synthesized SAPO-11 compositions for which X-ray powder diffraction data have been obtained to date have patterns which are within the generalized pattern of the Table II below.

TABLE II

| 2θ | d | 100 × I/I$_o$ |
|---|---|---|
| 8.05–8.3 | 10.98–10.65 | 20–42 |
| 9.4–9.65 | 9.41–9.17 | 36–58 |

TABLE II-continued

| 2θ | d | 100 × I/I$_o$ |
|---|---|---|
| 13.1–13.4 | 6.76–6.61 | 12–16 |
| 15.6–15.85 | 5.68–5.59 | 23–38 |
| 16.2–16.4 | 5.47–5.40 | 3–5 |
| 18.95–19.2 | 4.68–4.62 | 5–6 |
| 20.3–20.6 | 4.37–4.31 | 36–49 |
| 21.0–21.3 | 4.23–4.17 | 100 |
| 22.1–22.35 | 4.02–3.99 | 47–59 |
| 22.5–22.9 (doublet) | 3.95–3.92 | 55–60 |
| 23.15–23.35 | 3.84–3.81 | 64–74 |
| 24.5–24.9 (doublet) | 3.63–3.58 | 7–10 |
| 26.4–26.8 (doublet) | 3.38–3.33 | 11–19 |
| 27.2–27.3 | 3.28–3.27 | 0–1 |
| 28.3–28.5 (shoulder) | 3.15–3.13 | 11–17 |
| 28.6–28.85 | 3.121–3.094 | |
| 29.0–29.2 | 3.079–3.058 | 0–3 |
| 29.45–29.65 | 3 033–3.013 | 5–7 |
| 31.45–31.7 | 2.846–2.823 | 7–9 |
| 32.8–33.1 | 2.730–2.706 | 11–14 |
| 34.1–34.4 | 2.629–2.607 | 7–9 |
| 35.7–36.0 | 2.515–2.495 | 0–3 |
| 36.3–36.7 | 2.475–2.449 | 3–4 |
| 37.5–38.0 (doublet) | 2.398–2.368 | 10–13 |
| 39.3–39.55 | 2.292–2.279 | 2–3 |
| 40.3 | 2.238 | 0–2 |
| 42.2–42.4 | 2.141–2.132 | 0–2 |
| 42.8–43.1 | 2.113–2.099 | 3–6 |
| 44.8–45.2 (doublet) | 2.023–2.006 | 3–5 |
| 45.9–46.1 | 1.977–1.969 | 0–2 |
| 46.8–47.1 | 1.941–1.929 | 0–1 |
| 48.7–49.0 | 1.870–1.859 | 2–3 |
| 50.5–50.8 | 1.807–1.797 | 3–4 |
| 54.6–54.8 | 1.681–1.675 | 2–3 |
| 55.4–55.7 | 1.658–1.650 | 0–2 |

SAPO-31, another preferred intermediate pore size silicoaluminophosphate molecular sieve preferably employed in the process of the invention comprises a silicoaluminophosphate having a three-dimensional microporous crystal framework of $[PO_2]$, $[AlO_2]$ and $[SiO_2]$ tetrahedral units whose unit empirical formula on an anhydrous basis is:

$$mR:(Si_xAl_yP_z)O_2$$

wherein R represents at least one organic templating agent present in the intracrystalline pore system; "m" represents the moles of "R" present per mole of $(Si_xAl_yP_z)O_2$ and has a value of from zero to 0.3; "x", "y" and "z" represent respectively, the mole fractions of silicon, aluminum and phosphorus, said mole fractions being within the compositional area bounded by points A, B, C, D and E on the ternary diagram of FIG. 1, or preferably within the area bounded by points a, b, c, d and e on the ternary diagram of FIG. 2, said silicoaluminophosphate having a characteristic X-ray powder diffraction pattern (as-synthesized and calcined) which contains at least the d-spacings set forth below in Table III. When SAPO-31 is in the as-synthesized form, "m" preferably has a value of from 0.02 to 0.3.

TABLE III

| 2θ | d | Relative Intensity |
|---|---|---|
| 8.5–8.6 | 10.40–10.28 | m–s |
| 20.2–20.3 | 4.40–4.37 | m |
| 21.9–22.1 | 4.06–4.02 | w–m |
| 22.6–22.7 | 3.93–3.92 | vs |
| 31.7–31.8 | 2.823–2.814 | w–m |

All of the as-synthesized SAPO-31 compositions for which X-ray powder diffraction data have presently been obtained have patterns which are within the generalized pattern of Table IV below.

TABLE IV

| 2θ | d | 100 × I/I₀ |
|---|---|---|
| 6.1 | 14.5 | 0–1 |
| 8.5–8.6* | 10.40–10.28 | 60–72 |
| 9.5* | 9.31 | 7–14 |
| 13.2–13.3* | 6.71–6.66 | 1–4 |
| 14.7–14.8 | 6.03–5.99 | 1–2 |
| 15.7–15.8* | 5.64–5.61 | 1–8 |
| 17.05–17.1 | 5.20–5.19 | 2–4 |
| 18.3–18.4 | 4.85–4.82 | 2–3 |
| 20.2–20.3 | 4.40–4.37 | 44–55 |
| 21.1–21.2* | 4.21–4.19 | 6–28 |
| 21.9–22.1* | 4.06–4.02 | 32–38 |
| 22.6–22.7* | 3.93–3.92 | 100 |
| 23.3–23.35* | 3.818–3.810 | 2–20 |
| 25.1* | 3.548 | 3–4 |
| 25.65–25.75 | 3.473–3.460 | 2–3 |
| 26.5* | 3.363 | 1–4 |
| 27.9–28.0 | 3.198–3.187 | 8–10 |
| 28.7* | 3.110 | 0–2 |
| 29.7 | 3.008 | 4–5 |
| 31.7–31.8 | 2.823–2.814 | 15–18 |
| 32.9–33.0* | 2.722–2.714 | 0–3 |
| 35.1–35.2 | 2.557–2.550 | 5–8 |
| 36.0–36.1 | 2.495–2.488 | 1–2 |
| 37.2 | 2.417 | 1–2 |
| 37.9–38.1* | 2.374–2.362 | 2–4 |
| 39.3 | 2.292 | 2–3 |
| 43.0–43.1* | 2.103–2.100 | 1 |
| 44.8–45.2* | 2.023–2.006 | 1 |
| 46.6 | 1.949 | 1–2 |
| 47.4–47.5 | 1.918 | 1 |
| 48.6–48.7 | 1.873–1.870 | 2 |
| 50.7–50.8 | 1.801–1.797 | 1 |
| 51.6–51.7 | 1.771–1.768 | 2–3 |
| 55.4–55.5 | 1.658–1.656 | 1 |

*Possibly contains peak from a minor impurity

SAPO-41, an intermediate pore size silicoaluminophosphate molecular sieve also preferred for use in the process of the invention comprises a silicoaluminophosphate having a three-dimensional microporous crystal framework structure of [PO$_2$], [AlO$_2$] and [SiO$_2$] tetrahedral units and whose unit empirical formula on an anhydrous basis is:

$$mR:(Si_xAl_yP_z)O_2$$

wherein R represents at least one organic templating agent present in the intracrystalline pore system; "m" represents the moles of "R" present per mole of (Si$_x$Al$_y$P$_z$)O$_2$ and has a value of from zero to 0.3; "x", "y" and "z" represent respectively, the mole fractions of silicon, aluminum and phosphorus, said mole fractions being within the compositional area bounded by points A, B, C, D and E on the ternary diagram of FIG. 1, or preferably within the area bounded by points a, b, c, d and e on the ternary diagram of FIG. 2, said silicoaluminophosphate having a characteristic X-ray powder diffraction pattern (as-synthesized and calcined) which contains at least the d-spacings set forth below in Table V. When SAPO-41 is in the as-synthesized form, "m" preferably has a value of from 0.02 to 0.3.

TABLE V

| 2θ | d | Relative Intensity |
|---|---|---|
| 13.6–13.8 | 6.51–6.42 | w–m |
| 20.5–20.6 | 4.33–4.31 | w–m |
| 21.1–21.3 | 4.21–4.17 | vs |
| 22.1–22.3 | 4.02–3.99 | m–s |

TABLE V-continued

| 2θ | d | Relative Intensity |
|---|---|---|
| 22.8–23.0 | 3.90–3.86 | m |
| 23.1–23.4 | 3.82–3.80 | w–m |
| 25.5–25.9 | 3.493–3.44 | w–m |

All of the as-synthesized SAPO-41 compositions for which X-ray powder diffraction data have presently been obtained have patterns which are within the generalized pattern of Table VI below.

TABLE VI

| 2θ | d | 100 × I/I₀ |
|---|---|---|
| 6.7–6.8 | 13.19–12.99 | 15–24 |
| 9.6–9.7 | 9.21–9.11 | 12–25 |
| 13.6–13.8 | 6.51–6.42 | 10–28 |
| 18.2–18.3 | 4.87–4.85 | 8–10 |
| 20.5–20.6 | 4.33–4.31 | 10–32 |
| 21.1–21.3 | 4.21–4.17 | 100 |
| 22.1–22.3 | 4.02–3.99 | 45–82 |
| 22.8–23.0 | 3.90–3.87 | 43–58 |
| 23.1–23.4 | 3.82–3.80 | 20–30 |
| 25.2–25.5 | 3.53–3.49 | 8–20 |
| 25.5–25.9 | 3.493–3.44 | 12–28 |
| 29.3–29.5 | 3.048–3.028 | 17–23 |
| 31.4–31.6 | 2.849–2.831 | 5–10 |
| 33.1–33.3 | 2.706–2.690 | 5–7 |
| 37.6–37.9 | 2.392–2.374 | 10–15 |
| 38.1–38.3 | 2.362–2.350 | 7–10 |
| 39.6–39.8 | 2.276–2.265 | 2–5 |
| 42.8–43.0 | 2.113–2.103 | 5–8 |
| 49.0–49.3 | 1.856–1.848 | 1–8 |
| 51.5 | 1.774 | 0–8 |

The process of the invention may also be carried out by using a catalyst comprising an intermediate pore size nonzeolitic molecular sieve containing AlO$_2$ and PO$_2$ tetrahedral oxide units, and at least one Group VIII metal. Exemplary suitable intermediate pore size nonzeolitic molecular sieves are set forth in European Patent Application No. 158,977 which is incorporated herein by reference.

PROCESS CONDITIONS

The catalytic isomerization step of the invention may be conducted by contacting the feed to be dewaxed with a fixed stationary bed of catalyst, with a fixed fluidized bed, or with a transport bed, as desired. A simple and therefore preferred configuration is a trickle-bed operation in which the feed is allowed to trickle through a stationary fixed bed, preferably in the presence of hydrogen.

The catalytic isomerization conditions employed depend on the feed used and the desired pour point. Generally, the temperature is from about 200° C. and about 475° C., preferably between about 250° C. and about 450° C. The pressure is typically from about 15 psig and about 3000 psig, preferably between about 200 psig and 3000 psig. The liquid hourly space velocity (LHSV) preferably will be from 0.1 to 20, preferably between about 0.2 and 10.

Hydrogen is preferably present in the reaction zone during the catalytic isomerization process. The hydrogen to feed ratio is typically between about 500 and about 30,000 SCF/bbl (standard cubic feet per barrel), preferably from about 1000 to about 20,000 SCF/bbl. Generally, hydrogen will be separated from the product and recycled to the reaction zone.

The molecular sieve can be composited with other materials resistant to the temperatures and other conditions employed in the dewaxing process. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Inactive materials suitably serve as diluents to control the amount of conversion in the dewaxing process so that products can be obtained economically without employing other means for controlling the rate of reaction. The silicoaluminophosphates may be incorporated into naturally occurring clays, e.g., bentonite and kaolin. These materials, i.e., clays, oxides, etc., function, in part, as binders for the catalyst. It is desirable to provide a catalyst having good crush strength because in petroleum refining the catalyst is often subjected to rough handling. This tends to break the catalyst down into powder-like materials which cause problems in processing.

Naturally occurring clays which can be composited with the silicoaluminophosphate include the montmorillonite and kaolin families, which families include the sub-bentonites, and the kaolins commonly known as Dixie, McNamee, Georgia and Florida clays or others in which the main mineral constituent is halloysite, kaolinite, dickite, nacrite, or anauxite. Fibrous clays such as halloysite, sepiolite and attapulgite can also be used as supports. Such clays can be used in the raw state as originally mined or initially subjected to calcination, acid treatment or chemical modification.

In addition to the foregoing materials, the silicoaluminophosphates can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-titania, silica-alumina-magnesia and silica-magnesia-zirconia. The matrix can be in the form of a cogel.

The silicoaluminophosphate catalysts used in the process of this invention can also be composited with other zeolites such as synthetic and natural faujasites, (e.g., X and Y) erionites and mordenites. They can also be composited with purely synthetic zeolites such as those of the ZSM series. The combination of the zeolites can also be composited in a porous inorganic matrix.

The intermediate pore size silicoaluminophosphate molecular sieve catalyst is employed in the process of the invention to convert the waxy components to non-waxy components and reduce their pour point to from about 30° F. to about 60° F. The amount of catalyst employed is dependent on the reaction conditions.

The intermediate pore size aluminosilicate zeolite catalyst may be used in the same reactor as the silicoaluminophosphate molecular sieve catalyst, or may be used in a separate reactor. When both catalysts are used in the same reactor, the silicoaluminophosphate molecular sieve catalyst is layered on top of the aluminosilicate zeolite catalyst.

The aluminosilicate zeolite catalyst preferably contains a Group VIII metal, such as platinum, palladium, molybdenum, nickel, vanadium, cobalt, tungsten, zinc, and mixtures thereof. More preferably, the intermediate pore size aluminosilicate zeolite catalyst contains at least one Group VIII metal selected from the group consisting of platinum and palladium. Most preferably, the intermediate pore size aluminosilicate zeolite catalyst contains platinum.

The amount of metal ranges from about 0.01% to about 10% by weight of the molecular sieve, preferably from about 0.2% to about 5% by weight of the molecular sieve. The techniques of introducing catalytically active metals to a molecular sieve are disclosed in the literature, and pre-existing metal incorporation techniques and treatment of the molecular sieve to form an active catalyst such as ion exchange, impregnation or occlusion during sieve preparation are suitable for use in the present process. Such techniques are disclosed in U.S. Pat. Nos. 3,236,761; 3,226,339; 3,236,762; 3,620,960; 3,373,109; 4,202,996; 4,440,781 and 4,710,485 which are incorporated herein by reference.

Exemplary suitable aluminosilicate zeolite catalysts for use in the process of the invention include ZSM-22, ZSM-23 and ZSM-35.

The silicoaluminophosphate molecular sieve catalyst and the aluminosilicate zeolite catalyst are employed in the process of the invention in a weight ratio of the intermediate pore size silicoaluminophosphate molecular sieve to the intermediate pore size aluminosilicate zeolite molecular sieve of from about 1:5 to about 20:1.

When the catalysts are used in the same reactor, a fixed fluidized bed must be employed. When the catalysts are used in separate reactors, a transport bed must be employed.

It is often desirable to use mild hydrogenation referred to as hydrofinishing to produce more stable lubricating oils. The hydrofinishing step can be performed after the isomerization step. Hydrofinishing is typically conducted at temperatures ranging from about 190° C. to about 340° C., at pressures of from about 400 psig to about 3000 psig, at space velocities (LHSV) of from about 0.1 to about 20, and hydrogen recycle rates of from about 400 to about 1500 SCF/bbl. The hydrogenation catalyst employed must be active enough not only to hydrogenate the olefins, diolefins and color bodies within the lube oil fractions, but also to reduce the content of any aromatics present. The hydrofinishing step is beneficial in preparing an acceptably stable lubricating oil since unhydrofinished lubricant oils tend to be unstable in air and light and tend to spontaneously and quickly form sludges.

Suitable hydrogenation catalysts include conventional, metallic hydrogenation catalysts, particularly the Group VIII metals such as cobalt, nickel, palladium and platinum. The metals are typically associated with carriers such as bauxite, alumina, silica gel, silica-alumina composites, and crystalline aluminosilicate zeolites. Palladium is a particularly preferred hydrogenation metal. If desired, non-noble Group VIII metals can be used with molybdates. Metal oxides or sulfides can be used. Suitable catalysts are disclosed in U.S. Pat. Nos. 3,852,207; 4,157,294; 3,904,513 and 4,673,487, which are incorporated herein by reference.

The invention will be further clarified by the following examples, which are intended to be purely exemplary of the invention.

EXAMPLES

Example 1

A. SAPO-11 was grown according to U.S. Pat. No. 4,440,871 and identified as such by X-ray diffraction analysis. Elemental analysis of the calcined sieve showed it to have the following anhydrous molar composition:

0.21SiO$_2$:Al$_2$O$_3$:P$_2$O$_5$

The sieve was bound with 35% Catapal alumina and made into 1/16 inch extrudate. The extrudate was dried four hours at 250° F., calcined in air for four hours at 850° F., then impregnated with 1 weight percent Pt (as Pt(NH$_3$)$_4$Cl$_2$.H$_2$O) by the pore-fill method. It was then dried overnight at 275° F. and calcined in air for eight hours at 850° F.

B. ZSM-22 was prepared as follows:

The following reactants were combined to produce a gel: N,N'-dimethyl imidazolium hydroxide, Ludox AS-30 silica sol, aluminum sulfate, sodium hydroxide, and water in the ratios SiO$_2$/Al$_2$O$_3$=100
H$_2$O/SiO$_2$=30
template/SiO$_2$=0.15
NaOH/SiO$_2$=0.10
OH$^-$/SiO$_2$=0.25

The reaction was run at autogenous pressure in a stainless steel autoclave at 150° C. for 6 days. The product was filtered, calcined to 1000° F. in air, ion-exchanged four times with excess NH$_4$NO$_3$ and calcined again to 1000° F. The product was identified by X-ray diffraction analysis as ZSM-22. The SiO$_2$/Al$_2$O$_3$ mole ratio was about 100. The sieve was bound with 35% Catapal and the extrudate impregnated with 1% Pt and calcined in the same manner as the catalyst of Example 1A.

Example 2

The following catalysts were compared for dewaxing a +100° F. pour point lube oil (inspections given in Table VII) at 1 LHSV (overall), 2200 psig and 8M SCF/bbl H$_2$.

a) The Pt/SAPO-11 catalyst of Example 1A.
b) The Pt/ZSM-22 catalyst of Example 1B.
c) A layered bed of 3 parts by volume of the Pt/SAPO-11 catalyst over 1 part of the Pt/ZSM-22 catalyst.
d) A layered bed of 4 parts by volume of the Pt/SAPO-11 catalyst over 1 part of a conventional ZSM-5 catalyst containing 35% Catapal binder.

Here 800° F.+ lube yield is defined as:

$$1 - \frac{g\ 800°\ F.+\ (feed) - g\ 800°\ F.+\ (product)}{g\ 800°\ F.+\ (feed)} \times 100\%$$

Table VIII shows a higher lube yield for the SAPO-11/ZSM-22 layered bed than for either catalyst alone or Pt/SAPO over ZSM-5.

TABLE VII

| +100° F. Pour Point Lube Oil | |
|---|---|
| Gravity, °API | 34.0 |
| Aniline Point, °F. | 244.0 |
| Sulfur, ppm | 0.4 |
| Nitrogen, ppm | 0.1 |
| Wax, wt % | 14.6 |
| Pour Point, °F. | +100 |
| Viscosity, cSt, 100° C. | 6.195 |
| Flash Point, °F. | 420 |
| P/N/A/S, LV % | 25.0/62.1/12.8/0 |
| Simulated Distillation, LV %, °F. | |
| ST/5 | 313/770 |
| 10/30 | 794/841 |
| 50 | 873 |
| 70/90 | 908/968 |
| 95/EP | 998/1061 |

TABLE VIII

Dewaxing +100° F. Pour Point Lube Oil at 1 LHSV, 2200 psig, and 8M SCF/bbl H$_2$

| Catalyst | Pt/SAPO-11 | | Pt/ZSM-22 | | 3/1 Pt/SAPO-11 over Pt/ZSM-22 | | 4/1 Pt/SAPO-11 over ZSM-5 | |
|---|---|---|---|---|---|---|---|---|
| Catalyst Temp., °F. | 690 | 725 | 750 | 640 | 670 | 675 | 700 | 675 |
| Pour Pt, °F. | +30 | +15 | +5 | +15 | +10 | +20 | +5 | 0 |
| Viscosity, cSt, 40° C. | 34.99 | 36.65 | 35.91 | 45.34 | 44.29 | 39.60 | 35.50 | 45.47 |
| Viscosity, cSt, 100° C. | 6.234 | 6.372 | 6.272 | 7.164 | 7.059 | 6.641 | 6.215 | 6.994 |
| VI | 128 | 125 | 125 | 118 | 118 | 122 | 124 | 111 |
| 800° F.+ Lube Yield, Wt % | 79.0 | 77.5 | 68.0 | 82 | 81 | 88 | 86 | 69 |
| Simulated Distillation, LV %, F | | | | | | | | |
| ST/5 | 718/769 | 731/775 | 723/770 | 728/782 | 711/778 | 717/775 | 531/733 | 656/761 |
| 10/30 | 793/842 | 796/841 | 791/838 | 802/876 | 799/844 | 797/844 | 722/831 | 787/838 |
| 50 | 875 | 874 | 872 | 896 | 876 | 876 | 866 | 872 |
| 70/90 | 909/967 | 909/968 | 906/965 | 918/922 | 911/971 | 910/967 | 902/962 | 906/962 |
| 95/99 | 995/1062 | 998/1064 | 995/1060 | 1002/1061 | 1001/1059 | 996/1062 | 992/1057 | 991/1055 |

Example 3

The layered catalyst bed of Pt/SAPO-11 over Pt/ZSM-22 of Example 2C was compared with Pt/SAPO-11 catalyst alone (Example 1A) for dewaxing a +115° F. pour point lube oil (inspections given in Table IX) at 1 LHSV (overall), 2200 psig, and 8M SCF/bbl H$_2$. Table X shows a yield benefit for the layered bed combination.

TABLE IX

| +115° F. Pour Point Lube Oil | |
|---|---|
| Gravity, °API | 36.6 |
| Sulfur, ppm | 1.5 |
| Nitrogen, ppm | 0.2 |
| Wax, Wt % | 23.7 |
| Pour Point, °F. | +115 |
| Viscosity, cSt, 100° C. | 5.307 |
| Flash Point, °F. | 435 |
| P/N/A/S, LV % | 37.4/57.4/5.2/0 |
| Simulated Distillation, LV %, °F. | |
| ST/5 | 120/716 |
| 10/30 | 744/803 |
| 50 | 849 |
| 70/90 | 893/953 |
| 95/EP | 982/1035 |

TABLE X

Dewaxing +115° F. Pour Point Lube Oil at 1 LHSV, 2200 psig, and 8M SCF/bbl H₂

| Catalyst | Pt/SAPO-11 | | 3/1 Pt/SAPO-11 over Pt/ZSM-22 | Pt/ZSM-22 |
|---|---|---|---|---|
| Catalyst Temp., °F. | 725 | 750 | 675 | 700 |
| Pour Point, °F. | +25 | +10 | +15 | −5 |
| Viscosity, cSt, 40° C. | 27.87 | 26.78 | 30.45 | 28.55 |
| Viscosity, cSt, 100° C. | 5.513 | 5.348 | 5.746 | 5.481 |
| VI | 139 | 138 | 133 | 131 |
| 700° F.+ Lube Yield, Wt % | 79.3 | 65.0 | 78.5 | 74 |

Example 4

A. Another SAPO-11 sieve was grown and made into a catalyst as in Example 1A, except that the sieve had the following anhydrous molar composition.

$$0.31SiO_2:Al_2O_3:P_2O_5$$

B. Another ZSM-22 catalyst was made as in Example 1B, except that the Pt content was 0.8 wt. %.

Example 5

The following catalysts were compared for dewaxing another +100° F. pour point lube oil (inspections given in Table XI) at 1 LHSV (overall), 2200 psig, and 8M SCF/bbl H₂ to a pour point of +10° F.

a. The Pt/SAPO-11 catalyst of Example 4A.
b. The Pt/ZSM-22 catalyst of Example 4B.
c. A layered bed of 4 parts by volume of the Pt/SAPO-11 catalyst over 1 part of the Pt/ZSM-22 catalyst.
d. A layered bed of 1 part by volume of the Pt/SAPO-11 catalyst over 1 part of the Pt/ZSM-22 catalyst.

Results given in Table XII again show higher yields with the layered bed than for either catalyst separately.

TABLE XI

+100° F. Pour Point Lube Oil

| | |
|---|---|
| Gravity, °API | 34.2 |
| Sulfur, ppm | 1.6 |
| Nitrogen, ppm | 0.2 |
| Wax, Wt % | 14.4 |
| Pour Point, °F. | +100 |
| Viscosity, cSt, 100° C. | 5.629 |
| Flash Point, °F. | 440 |
| P/N/A/S, LV % | 29.4/61.8/8.7/0.1 |
| Simulated Distillation, LV %, °F. | |
| ST/5 | 697/737 |
| 10/30 | 758/807 |
| 50 | 843 |
| 70/90 | 882/946 |
| 95/EP | 977/1041 |

TABLE XII

Dewaxing +100° F. Pour Point Lube Oil to +10° F. Pour Point at 1 LHSV, 2200 psig, and 8M SCF/bbl H₂

| Catalyst | Pt/SAPO-11 | Pt/ZSM-22 | 4/1 Pt/SAPO-11 over Pt/ZSM-22 | 1/1 Pt/SAPO-11 over Pt/ZSM-22 |
|---|---|---|---|---|
| Catalyst Temp, °F. | 700 | 575 | 660 | 675 |
| Viscosity, cSt, 40° C. | 31.74 | 37.46 | 32.94 | 33.27 |
| Viscosity, cSt, 100° C. | 5.796 | 6.268 | 5.850 | 5.868 |
| VI | 126 | 116 | 121 | 120 |
| 800° F.+ Lube Yield, Wt % | 74 | 84.4 | 86.0 | 87.2 |
| Simulated Distillation, LV %, °F. | | | | |
| ST/5 | 688/744 | 682/743 | 685/738 | 556/725 |
| 10/30 | 766/815 | 766/816 | 761/810 | 754/811 |
| 50 | 851 | 853 | 847 | 850 |
| 70/90 | 890/951 | 891/952 | 886/948 | 890/951 |
| 95/99 | 981/1036 | 982/1039 | 978/1032 | 982/1035 |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A process for catalytically dewaxing a hydrocarbon oil feedstock boiling above about 350° F. and containing straight chain and slightly branched chain hydrocarbons comprising contacting said hydrocarbon oil feedstock in the presence of added hydrogen gas sequentially with a layered catalyst comprising a SAPO-11, SAPO-31 or SAPO-41 intermediate pore size silicoaluminophosphate molecular sieve and a hydrogenation component, and an intermediate pore size aluminosilicate zeolite catalyst.

2. The process of claim 1 wherein said intermediate pore size silicoaluminophosphate molecular sieve is SAPO-11.

3. The process of claim 1 wherein said hydrogenation component comprises a Group VIII metal.

4. The process of claim 3 wherein said Group VIII metal is platinum or palladium.

5. The process of claim 1 wherein said silicoaluminophosphate sieve is SAPO-11 and said hydrogenation component comprises platinum.

6. The process of claim 5 wherein said catalyst comprising said silicoaluminophosphate molecular sieve and a hydrogenation component further comprises an inorganic oxide matrix.

7. The process of claim 6 wherein said inorganic oxide matrix is alumina.

8. The process of claim 1 wherein said hydrogenation component is present in an amount of from about 0.01% to about 10% based on the weight of said molecular sieve.

9. The process of claim 1 wherein said contacting is carried out at a temperature of from about 200° C. to 475° C., a pressure of from about 15 psig to about 3000 psig, a liquid hourly space velocity of from about 0.1

$hr^{-1}$ to about 20 $hr^{-1}$, and a hydrogen circulation rate of from 500 to about 30,000 SCF/bbl.

10. The process of claim 1 wherein said hydrocarbon oil feedstock is a middle distillate oil.

11. The process of claim 1 wherein said feedstock is a lube oil feedstock.

12. The process of claim 1 wherein said hydrocarbon oil feedstock contains less than 50 ppmw organic nitrogen.

13. The process of claim 1 wherein said hydrocarbon oil feedstock contains less than 10 ppmw organic nitrogen.

14. The process of claim 1 wherein said hydrocarbon oil feedstock is contacted with said catalysts in one reactor.

15. The process of claim 14 wherein in said reactor said catalyst comprising an intermediate pore size silicoaluminophosphate molecular sieve and a hydrogenation component is layered on top of said intermediate pore size aluminosilicate zeolite catalyst.

16. The process of claim 1 wherein said intermediate pore size aluminosilicate zeolite has a Constraint Index measured at from about 400° C. to about 454° C. of from about 4 to about 12.

17. The process of claim 16 wherein said intermediate pore size aluminosilicate zeolite is selected from the group consisting of ZSM-22, ZSM-23 and ZSM-35.

18. The process of claim 1 wherein said intermediate pore size aluminosilicate zeolite catalyst further comprises a metal selected from the group consisting of platinum, palladium, molybdenum, nickel, vanadium, cobalt, tungsten and zinc.

19. The process of claim 18 wherein said metal is selected from the group consisting of platinum and palladium.

20. The process of claim 19 wherein said metal is platinum.

21. The process of claim 1 wherein the weight ratio of said intermediate pore size silicoaluminophosphate molecular sieve to said intermediate pore size silicoaluminophosphate zeolite molecular sieve is from about 1:5 to about 20:1.

* * * * *